US006902169B2

(12) United States Patent
Wild

(10) Patent No.: US 6,902,169 B2
(45) Date of Patent: Jun. 7, 2005

(54) SEALED CROWN FOR WATCH CASING

(75) Inventor: Daniel Wild, Le Sentier (CH)

(73) Assignee: Richemont international SA, Villars-sur-Glane (CH)

(*) Notice: Subject to any disclaimer, the term of this patent is extended or adjusted under 35 U.S.C. 154(b) by 0 days.

(21) Appl. No.: 10/201,918

(22) Filed: Jul. 25, 2002

(65) Prior Publication Data

US 2003/0030230 A1 Feb. 13, 2003

(30) Foreign Application Priority Data

Jul. 28, 2001 (EP) ............................................ 01118399

(51) Int. Cl.[7] ................................................ H02G 15/04

(52) U.S. Cl. ....................... 277/602; 368/288; 368/308; 368/319

(58) Field of Search ................................ 368/289, 319, 368/306, 308, 288, 290; 968/340, DIG. 1; 277/602

(56) References Cited

U.S. PATENT DOCUMENTS

| | | | | | |
|---|---|---|---|---|---|
| 666,569 | A | * | 1/1901 | Sporleder | 368/306 |
| 915,571 | A | * | 3/1909 | Duchesne | 368/306 |
| 1,292,441 | A | * | 1/1919 | Depollier | 368/289 |
| 1,292,540 | A | * | 1/1919 | Tough | 368/289 |
| 1,294,895 | A | | 2/1919 | Golden | |
| 1,295,023 | A | | 2/1919 | Golden | |
| 2,288,215 | A | * | 6/1942 | Taubert et al. | 368/319 |
| 2,309,428 | A | * | 1/1943 | Aegler | 368/288 |
| 2,391,803 | A | * | 12/1945 | Simon | 368/290 |
| 2,482,317 | A | * | 9/1949 | Borer | 368/288 |
| 2,507,974 | A | * | 5/1950 | Henry | 368/288 |
| 3,146,580 | A | * | 9/1964 | Simon | 368/289 |
| 3,164,954 | A | * | 1/1965 | Soguel | 368/288 |
| 3,358,438 | A | * | 12/1967 | Simon | 368/289 |
| 3,362,154 | A | * | 1/1968 | Perret | 368/290 |
| 3,376,701 | A | * | 4/1968 | Grohoski | 368/289 |
| 3,389,550 | A | * | 6/1968 | Piquerez | 368/308 |
| 3,389,551 | A | * | 6/1968 | Wyssen | 368/289 |
| 3,418,800 | A | * | 12/1968 | Hashii | 368/28 |
| 3,525,211 | A | * | 8/1970 | Wyssen | 368/289 |
| 3,535,869 | A | * | 10/1970 | Zellweger | 368/289 |
| 3,614,865 | A | * | 10/1971 | Widmer | 368/289 |
| 3,633,356 | A | * | 1/1972 | Kitazima | 368/299 |
| 3,686,883 | A | * | 8/1972 | Tarusawa | 368/289 |
| 4,043,115 | A | * | 8/1977 | Bryceland | 368/69 |
| 4,089,158 | A | * | 5/1978 | Wenger | 368/216 |
| 4,292,682 | A | * | 9/1981 | Wenger | 368/289 |
| 4,313,187 | A | * | 1/1982 | Waki et al. | 368/319 |
| 5,257,247 | A | * | 10/1993 | Miche et al. | 368/290 |
| 5,383,166 | A | * | 1/1995 | Gallay | 368/288 |
| 5,521,890 | A | * | 5/1996 | Miche et al. | 368/319 |
| 5,742,565 | A | * | 4/1998 | Cuinet et al. | 368/190 |
| 6,137,750 | A | * | 10/2000 | Rieben | 368/290 |
| 6,173,968 | B1 | * | 1/2001 | Nelson et al. | 277/619 |
| 6,200,019 | B1 | * | 3/2001 | Latini | 368/289 |
| 6,200,020 | B1 | * | 3/2001 | Rieben | 368/290 |
| 6,210,034 | B1 | * | 4/2001 | Latini | 368/289 |
| 6,385,134 | B1 | * | 5/2002 | Lange et al. | 368/11 |
| 6,447,159 | B1 | * | 9/2002 | Damasko | 368/308 |

FOREIGN PATENT DOCUMENTS

| | | | | | |
|---|---|---|---|---|---|
| CH | 350249 | | | 12/1960 | |
| CH | 617310 | A | * | 5/1980 | G04B/37/08 |
| CH | 655826 | A | * | 5/1986 | G04B/37/10 |
| EP | 26740 | A1 | * | 4/1981 | G04B/3/04 |
| EP | 400207 | A1 | * | 12/1990 | G04B/3/04 |
| FR | 670172 | | | 11/1939 | |
| FR | 1506657 | | | 12/1967 | |
| FR | 2 783 939 | | | 3/2000 | |
| JP | 55076969 | A | * | 6/1980 | G04B/3/04 |
| JP | 05281372 | A | * | 10/1993 | G04G/1/00 |
| JP | 06027254 | A | * | 2/1994 | G04B/37/18 |

* cited by examiner

*Primary Examiner*—Robert J. Sandy
*Assistant Examiner*—Thomas Ho
(74) *Attorney, Agent, or Firm*—Young & Thompson

(57) ABSTRACT

The sealing device for a control member (17) is provided with a shaft (16) passing through a sealed casing and comprising a tube (1) driven into a bore (3) of the casing (4) . A shaft (16) of the control member (17) is engaged in the tube (1) and at least one joint (18, 19) ensures normal sealing between this tube and this shaft. It comprises a compression key (6) screwed on the tube (1) comprising an upper portion (8) overlying the tube (1) and surrounding the shaft (16) of the control member (17). A compression joint (15) is disposed in the space comprised between the upper portion (8) of the compression key, the tube (1) and the shaft (16).

21 Claims, 2 Drawing Sheets

SEALED CROWN FOR WATCH CASING

BACKGROUND OF THE INVENTION

The present invention has for its object a sealing device for a control member passing through the wall of a watch casing such as a setting crown or a pushbutton for example.

SUMMARY OF THE INVENTION

The object of the present invention is to provide a sealed device for a control member passing through the wall of a watch casing, which permits ensuring normal sealing, for example resistant to 10 Atmospheres, during use of the control member and increased sealing when the control member is not used, for example resistant to 100 Atmospheres.

Another object of the present invention is to avoid, during passage from normal sealing to increased sealing, any angular and/or axial movement of the control member to avoid any interaction with the control mechanism.

Still another object of the invention is the provision of such a sealing device which will be simple to produce and to mount and which can be easily dismounted by post-sale service, for example to change the seals.

The present invention has for its object a sealing device for a control member passing through a watch casing, which overcomes the drawbacks of the existing devices and permits achieving the objects set forth above, this sealing device being distinguished by the characteristics set forth below.

BRIEF DESCRIPTION OF THE DRAWINGS

The accompanying drawings show schematically and by way of example three embodiments and two modifications of the sealing device according to the invention.

DESCRIPTION OF THE PREFERRED EMBODIMENT

Figure 1:
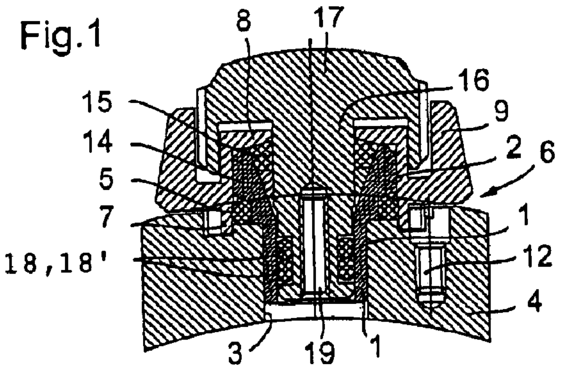
FIG. 1 is a cross-sectional view of the sealing device in the increased sealing position.
Figure 2:
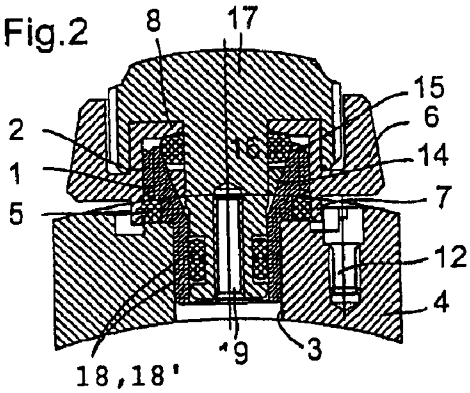
FIG. 2 is a cross-sectional view of the sealing device in the normal sealing position, for actuating the control member.

The present sealing device for a control member passing through a casing, in particular a watch casing, is applicable also to pushbuttons which more particularly have a setting shaft or crown. This device permits considerably increasing the sealing of the control member. With the help of this device, normal sealing of about 10 Atmospheres which is present during manipulations of the control member can be increased to a value of the order of 100 Atmospheres by a simple manipulation of a compression key, which manipulation also immobilizes the control member in its inactive position.

Moreover, as will be seen later, this sealing device is easy to produce and to mount on a sealed casing because it comprises only few pieces that are easy to machine. Moreover, the after sale service is simplified because dismounting the device, particularly to change the seals, can take place easily without returning to the factory by a watchmaker present at the point of sale.

The sealing device according to the present invention is shown in the accompanying drawings in relation to the sealing of a setting crown and comprises a tube 1 comprising an internal cylindrical portion and an external cylindrical portion of larger diameter provided with a screw thread 2. In its lower portion, this tube 1 comprises a cylindrical bore whilst in its upper portion the tube 1 has a central conical opening flaring toward the outer end of the tube 1.

The internal cylindrical end of smaller diameter is forcibly driven into a bore 3 passing through the sealed casing 4. Below the screw threads 2 of the tube 1 there is an annular throat in which is disposed an O-ring joint 5 coacting with this tube 1, with the external surface of the casing 4 and, as will be seen later, with the compression key 6.

The compression key 6 of the first embodiment shown in FIGS. 1 to 6 comprises a body provided with an internal screw thread corresponding to the screw thread 2 of the tube and screwed on the latter. This body is provided with a sleeve 7 whose internal surface coacts with the joint 5 and with an upper portion 8 having the shape of a crown whose lower surface has a conical portion. The body of this compression key 6 moreover comprises two external wings 9 permitting its manipulation by the user.

Thus, when the tube 1 is driven into the bore 3 of the casing 4 and the compression key 6 is screwed onto this tube, the joint 5 ensures sealing between the compression key 6 and the tube 1 and protects the screw threading 2. Moreover, this joint 5 ensures a certain friction between the tube 1 and the compression key such that the latter will not move untimely, but only under the effect of a couple which the user can impose on it.

Figure 3:
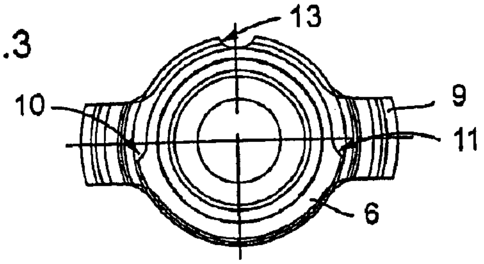
FIG. 3 is a bottom view of the compression key.
Figure 4:
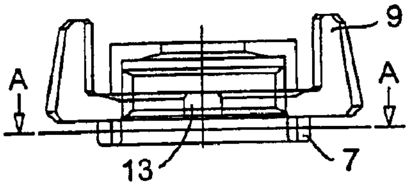
FIG. 4 is a side view of the compression key.
Figure 5:
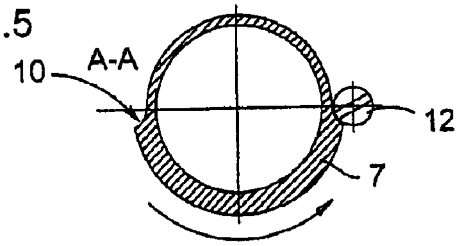
FIGS. 5 and 6 are cross-sectional views on the line A—A of FIG. 4 in the open position, respectively the closed position of the compression key.
Figure 6:
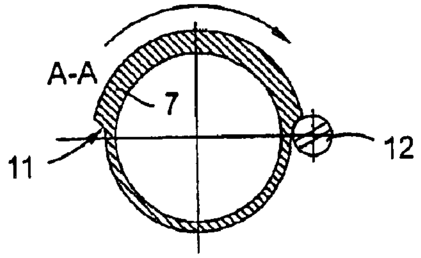

As seen in FIGS. 3, 5 and 6, the sleeve 7 of the compression key 6 is milled about 180° of its periphery so as to create two abutments 10, 11 adapted to coact with the head of a screw 12 screwed into the watch casing and thus limiting the rotation of the compression key to about 180°. The periphery of the compression key 6 comprises a recess 13 permitting access to the screw head 12 to install and remove it when dismounting the sealing device and replacing the seals.

Screw 12 constitutes a stop coacting with the abutments 10, 11 of the compression key to limit the rotation of the latter between an open position and a closed position.

The sealing device moreover comprises a split ring 14, preferably of Delrin or of steel, of conical shape, disposed in the narrow portion of the internal cone of the tube 1. On this ring 14 is disposed an O-ring joint 15 whose upper portion bears against the lower surface of the upper portion 8 of the compression key.

In the open position, unscrewed, of the compression key 6, this joint 15 is only partially compressed (FIG. 2) whilst in the closed position, screwed in, of the compression key, this joint 15 is totally compressed (FIG. 1) between the upper portion 8 of the compression key, the tube 1, the ring 14 and the shaft 16 of the crown 17.

The setting crown 17 comprises a shaft 16 passing through the upper portion 8 of the compression key 6, the ring 14 and the cylindrical portion of the tube 1. The end of the shaft 16 of the crown 17 is provided with two O-ring joints 18, 18' disposed in a circular throat provided in the external cylindrical wall of the shaft 16. These joints 18' ensure normal sealing of the order of 10 Atmospheres, between the tube 1 and the shaft 16 when the compression key is open. In this position, the user can actuate the setting shaft 16 axially and in rotation.

When the compression key is screwed in or closed, the joint 15 is totally compressed and forces the split ring to the bottom of the cone of the tube 1 and against the setting shaft 16. In this position, the sealing is very substantially increased and reaches a value of 100 Atmospheres and the shaft 14 is blocked.

The shaft 16 of the setting crown comprises, in the usual way, an axial screw thread 19 in its internal end permitting coupling to the setting shaft properly so called of the mechanism.

Thanks to this sealing mechanism, there is achieved a high sealing, 100 Atmospheres, in the closed position of the compression key and the setting shaft is blocked. The watch can be worn in this position and it is only during setting of the time of the movement that the user frees the compression key to permit this function. In this open position, the sealing is nevertheless guaranteed at a normal value of the order of 10 Atmospheres.

A supplemental advantage of the sealing device resides in the fact that during passage from the open position to the closed position of the compression key and vice versa, the shaft 16 of the crown 17 undergoes no axial displacement which could damage the mechanism.

Moreover, if the screw pitch used to screw the compression key onto the tube comprises a left hand thread, when a user tightens the compression key, even if the user simultaneously turns the crown 17, as he might accidentally do, the mechanism cannot be damaged. Thus, the rotation for tightening the compression key takes place in the reverse direction of the rotation of the crown 17 for setting the watch. There is thus never a risk of over-tensioning of the mainspring.

Figure 7:
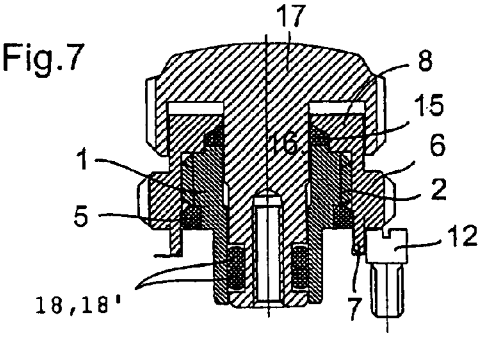
FIG. 7 shows in cross-section a second embodiment of the sealing device.

In the second embodiment of the sealing device shown in FIG. 7, the compression key 6 has no wing 9 but rather a can be manipulated by a notched crown. In this embodiment, the tube 1 comprising the screw thread 2 comprises a central cylindrical passage over all its length and the joint 15 is disposed between the end external surface of the tube 1, the upper portion 8 of the compression key 6 and the shaft 16 of the crown 17. In this embodiment, the compression joint 15 is mounted without the split ring 17.

Figure 8:
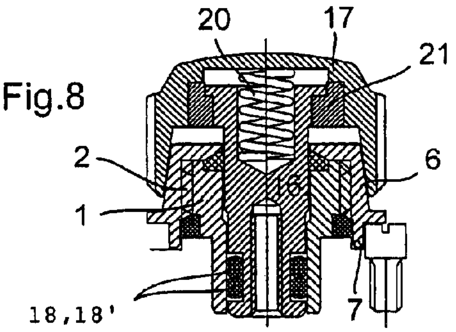
FIG. 8 shows in cross-section a third embodiment of the sealing device.

In the third embodiment, shown in FIG. 8, the external surface of the compression key 6 forms a milled or striated cone and the crown 17 is mounted on the shaft 16 so as to be able to slide axially against the action of a spring 20 by means of a ring 21 driven into the crown 17 serving as an axial abutment. The skirt of the crown 17 has an internal surface that forms a cone corresponding to the external cone of the compression key. Thus, when the user pushes on the crown 17 against the action of the spring 20, he can drive in rotation the compression key 6 with the help of the crown 17 by coupling of the two cones.

Figure 9:
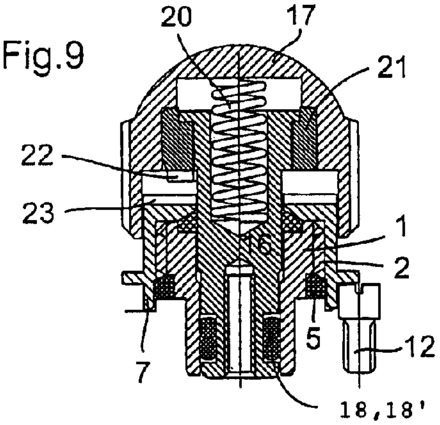
FIGS. 9 and 10 show in cross-section modifications in the shape of the embodiment shown in FIG. 8.
Figure 10:
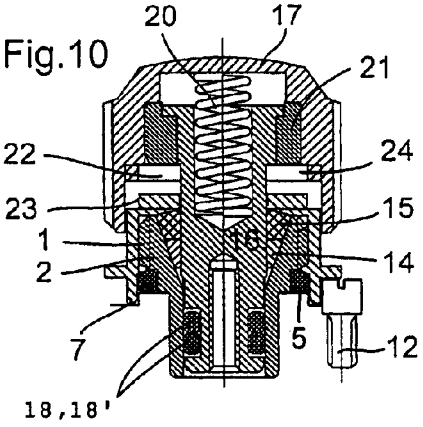

In the modifications illustrated in FIGS. 9 and 10, the drive of the compression key 6 by the crown 17 takes place by the wings or by six flats that couple when the crown 17 is pushed against the action of the spring 20.

In these three last embodiments (FIGS. 8–10) the crown 17 is axially movable against the action of a spring 20 relative to the shaft 16 and this axial movement engages and disengages a drive coupling between the crown 17 or the ring 21 which is secured to it, and the compression key 6. The user can thus screw or unscrew the compression key by pushing on the crown 17 and driving the latter in one direction or the other. This coupling can be effected by the wings 22 and corresponding recesses 23 (FIG. 9) or by six female flats 24 and six male flats 25 (FIG. 10).

What is claimed is:

1. A sealing device for a control member of a watch, said control member comprising a shaft passing through a watch casing and an external control member portion disposed outside the watch casing, coupled to the shaft and manipulable by a user to actuate a displacement of the shaft, said sealing device comprising:

- a tube driven into a bore of the casing, said shaft of said control member engaged in a central passage of the tube,
- at least one joint ensuring normal sealing between the tube and the shaft,
- a compression key screwed onto the tube and comprising an upper portion overlying the end of the tube and surrounding the shaft, wherein the compression key is rotatable around the tube independently of the external control member portion, and
- a compression joint disposed in a space between the upper portion of the compression key, the tube and the shaft, wherein the degree of compression of the compression joint, and thus the degree of sealing provided by said compression joint can be heightened by rotating the compression key with respect to the tube from an open position to a closed position, the rotation of the compression key from the open position to the closed position not causing an axial displacement of the external control member portion.

2. A sealing device for a control member of a watch, said control member comprising a shaft passing through a watch casing and an external control member portion disposed outside the watch casing, coupled to the shaft and manipulable by a user to actuate a displacement of the shaft, said sealing device comprising:

- a tube driven into a bore of the casing, said shaft of said control member engaged in a central passage of the tube,
- at least one joint ensuring normal sealing between the tube and the shaft,
- a compression key screwed onto the tube and comprising an upper portion overlying the end of the tube and surrounding the shaft, and
- a compression joint disposed in a space between the upper portion of the compression key, the tube and the shaft, wherein the degree of sealing provided by said compression joint can be heightened by rotating the compression key with respect to the tube from a first position to a second position, the rotation of the compression key from the first position to the second position not causing an axial displacement of the external control member portion,
- further comprising means for limiting the angle of rotation of the compression key with respect to the tube to a value less than 360°.

3. The sealing device of claim 2, wherein the means for limiting the angle of rotation of the compression key comprise a stop fixed in the casing and a milling provided in the compression key defining two abutments.

4. The sealing device of claim 3, wherein the stop is constituted by a screw and the periphery of the compression key comprises a recess giving access to this screw for an angular position determined by the compression key.

5. The sealing device of claim 1, wherein the central passage of the tube has in an external portion of the tube the shape of a cone flaring outwardly and the compression joint is disposed in the conical portion of said central passage and bears against the lower surface of the upper portion of the compression key.

6. The sealing device of claim 5, wherein in a part of the conical portion of the central passage having a small diameter a split ring having a triangular cross-section is disposed providing passage to the shaft and supporting the compression joint.

7. The sealing device of claim 1, wherein the shaft is secured to and made of one piece with the external control member portion.

8. The sealing device of claim 1, further comprising means for driving the compression key in rotation.

9. The sealing device of claim 8, wherein the external control member portion is mounted so that it is axially movable against the action of a spring on the shaft.

10. A sealing device for a control member of a watch, said control member comprising a shaft passing through a watch casing and an external control member portion disposed outside the watch casing, coupled to the shaft and manipulable by a user to actuate a displacement of the shaft, said sealing device comprising:

a tube driven into a bore of the casing, said shaft of said control member engaged in a central passage of the tube, at least one joint ensuring normal sealing between the tube and the shaft, a compression key screwed onto the tube and comprising an upper portion overlying the end of the tube and surrounding the shaft, a compression joint disposed in a space between the upper portion of the compression key, the tube and the shaft, wherein the degree of compression of the compression joint, and thus the degree of sealing provided by said compression joint can be heightened by rotating the compression key with respect to the tube from an open position to a closed position, the rotation of the compression key from the open position to the closed position not causing an axial displacement of the external control member portion, and means for driving the compression key in rotation, wherein the external control member portion is mounted so that it is axially movable against the action of a spring on the shaft, and wherein the means for driving in rotation the compression key comprise a coupling between the compression key and the external control member portion that can be engaged when the external control member portion is moved axially against the action of the spring.

11. The sealing device of claim 1, further comprising a joint between the watch casing, the tube and the compression key to protect a screw thread provided on an external surface of the tube and coacting with a corresponding screw thread provided on an internal surface of the compression key.

12. A sealed control member for insertion into a bore within a watch casing, the watch casing having a tube inserted within said bore and the tube protruding in part out of said bore, the control member comprising:

a control member shaft inserted within the tube;

an external control member portion coupled to the shaft and disposed outside the watch casing for enabling rotational and axial actuation of the control member shaft by a user;

one or more first sealing joints disposed around the shaft and within the tube;

a compression key surrounding the shaft, the compression key having a sleeve portion rotatably mounted around the protruding part of the tube and an upper portion overlying the protruding part of the tube, wherein the compression key is rotatable around the tube independently of the external control member between an open position and a closed position, the rotation of the compression key between the open and the closed position not causing an axial displacement of the external control member portion; and one or more second sealing joints disposed between the upper portion of the compression key, the tube, and the shaft, wherein the one or more second sealing joints have a heightened degree of compression, and thus provide a heightened degree of sealing when the compression key is in the closed position compared to when the compression key is in the open position.

13. The sealed control member of claim 12 wherein the compression key further comprises one or more wings extending from the sleeve portion, the one or more wings enabling a user to rotate the compression key between the open and closed positions.

14. The sealed control member of claim 13 wherein the shaft and external control member portion are made as one piece.

15. The sealed control member of claim 13 wherein the tube comprises a screw thread on an external surface thereof and the sleeve portion of the compression key comprises a corresponding screw thread on an internal surface thereof, whereby the threads enable the compression key to be rotated around the tube between the open and closed positions;

the screw threads are disposed such that the direction of rotation of the compression key from the open position toward the closed position is opposite the direction of rotation of the external control member portion when setting a watch movement disposed in the watch casing.

16. A sealed control member for insertion into a bore within a watch casing, the watch casing having a tube inserted within said bore and the tube protruding in part out of said bore, the control member comprising:

a control member shaft inserted within the tube;

an external control member portion coupled to the shaft and disposed outside the watch casing for enabling rotational and axial actuation of the control member shaft by a user;

one or more first sealing joints disposed around the shaft and within the tube;

a compression key surrounding the shaft, the compression key having a sleeve portion rotatably mounted around the protruding part of the tube and an upper portion overlying the protruding part of the tube, wherein the compression key is rotatable around the tube between an open position and a closed position, the rotation of the compression key between the open and the closed position not causing an axial displacement of the external control member portion; and one or more second sealing joints disposed between the upper portion of the compression key, the tube, and the shaft, wherein the one or more second sealing joints have a heightened degree of compression, and thus provide a heightened degree of sealing when the compression key is in the closed position compared to when the compression key is in the open position, wherein the shaft and external control member portion are made as separate pieces and the shaft is coupled to the external control member portion via a spring, the external control member portion being movable axially inwards towards the watch casing against the action of the spring, and wherein the sealed control member further comprises means for rotatably engaging the external control member portion with the compression key when the external control member portion is pushed axially inwards.

17. A sealed control member for insertion into a bore within a watch casing, the watch casing having a tube inserted within said bore and the tube protruding in part out of said bore, the control member comprising:

a control member shaft inserted within the tube;

an external control member portion coupled to the shaft and disposed outside the watch casing for enabling rotational and axial actuation of the control member shaft by a user;

one or more first sealing joints disposed around the shaft and within the tube;

a compression key surrounding the shaft, the compression key having a sleeve portion rotatably mounted around the protruding part of the tube and an upper portion overlying the protruding part of the tube, wherein the compression key is rotatable around the tube between an open position and a closed position, the rotation of the compression key between the open and the closed position not causing an axial displacement of the external control member portion;

one or more second sealing joints disposed between the upper portion of the compression key, the tube, and the shaft, wherein the one or more second sealing joints have a heightened degree of compression, and thus provide a heightened degree of sealing when the compression key is in the closed position compared to when the compression key is in the open position; and first and second abutments for engaging with a stop on the watch casing, the abutments preventing the compression key from being rotated other than between the open and closed positions, and whereby the angle of rotation between the open and closed positions is less than 360°.

18. The sealed control member of claim 12 wherein the protruding part of the tube provides a generally conically shaped opening flaring outwardly from the watch casing, and wherein the one or more second sealing joints are further disposed above a split ring disposed around the shaft near the base of the conically shaped opening.

19. The sealed control member of claim 12 further comprising one or more third sealing joints disposed between the protruding part of the tube, the watch casing, and the sleeve portion of the compression key.

20. The sealed control member of claim 12 wherein the tube has a screw thread on an external surface thereof and the sleeve portion of the compression key has a corresponding screw thread on an internal surface thereof, whereby said screw threads enable the compression key to be rotated around the tube between the open and closed positions.

21. The sealed control member of claim 20 wherein the screw threads are disposed such that the direction of rotation of the compression key from the open position toward the closed position is opposite the direction of rotation of the external control member portion when setting a watch movement disposed in the watch casing.

* * * * *